Oct. 18, 1927.

E. R BURTNETT 1,645,796

INTERNAL COMBUSTION ENGINE

Filed Oct. 8, 1924

INVENTOR,
E. R. Burtnett.
By Martin P. Smith
ATTY.

Patented Oct. 18, 1927.

1,645,796

UNITED STATES PATENT OFFICE.

EVERETT R. BURTNETT, OF LOS ANGELES, CALIFORNIA, ASSIGNOR, BY DIRECT AND MESNE ASSIGNMENTS, TO THE AUTOMOTIVE VALVES CO., OF LOS ANGELES, CALIFORNIA, A VOLUNTARY TRUST.

INTERNAL-COMBUSTION ENGINE.

Application filed October 8, 1924. Serial No. 742,407.

My invention relates generally to internal combustion engines that operate on the two stroke cycle principle, and more particularly to a head for the combustion cylinders of the engine, said head having a turbulence chamber that serves as a common clearance space for the combustion chambers and within which turbulence chamber the combined residual and fresh gaseous fuel charge is caused to be highly agitated, thereby effecting a thorough and intimate mixture of said residual and fresh gaseous fuel charge while the pistons within the combustion chambers are moving inwardly or upwardly on their compression stroke.

The principal objects of my invention are to provide a twin combustion cylinder head having a turbulence chamber that is formed so that the greater portion thereof is coincident with and in effect forms a continuation of the combustion chamber in one of the combustion cylinders; to form in said head a relatively short duct or passageway that connects the upper ends of the two combustion cylinders, said duct being formed so that it connects the adjacent sides of the two combustion chambers and being disposed substantially tangential to the turbulence chamber in the head above one of the combustion chambers; and, further, to form the side walls of the short connecting duct immediately adjacent to the turbulence chamber so that the gaseous fuel passing from one combustion chamber to the other through said duct and into the turbulence chamber is forced against the curved outer wall of said turbulence chamber so as to impart initial whirling movement to said gaseous fuel as it enters the turbulence chamber, which action is accomplished without materially decreasing the cross sectional dimensions of said duct or in any way restricting the free flowing movement of the gaseous fuel through said duct and from one combustion chamber to the other.

My present invention is an improvement on the turbulence head disclosed in my copending application filed July 31, 1924, Serial No. 729,300.

Figure 1:
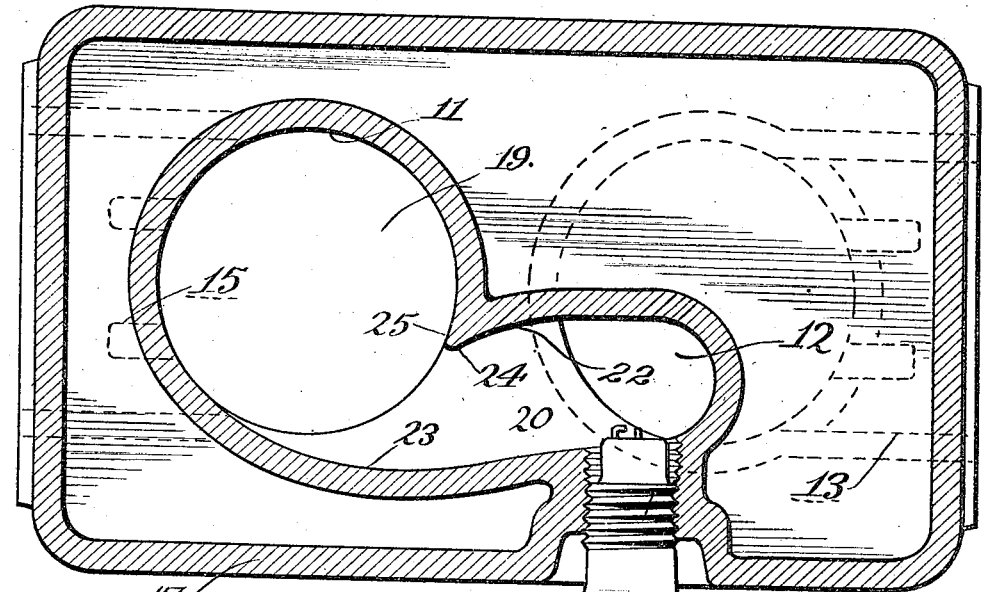
Figure 2:
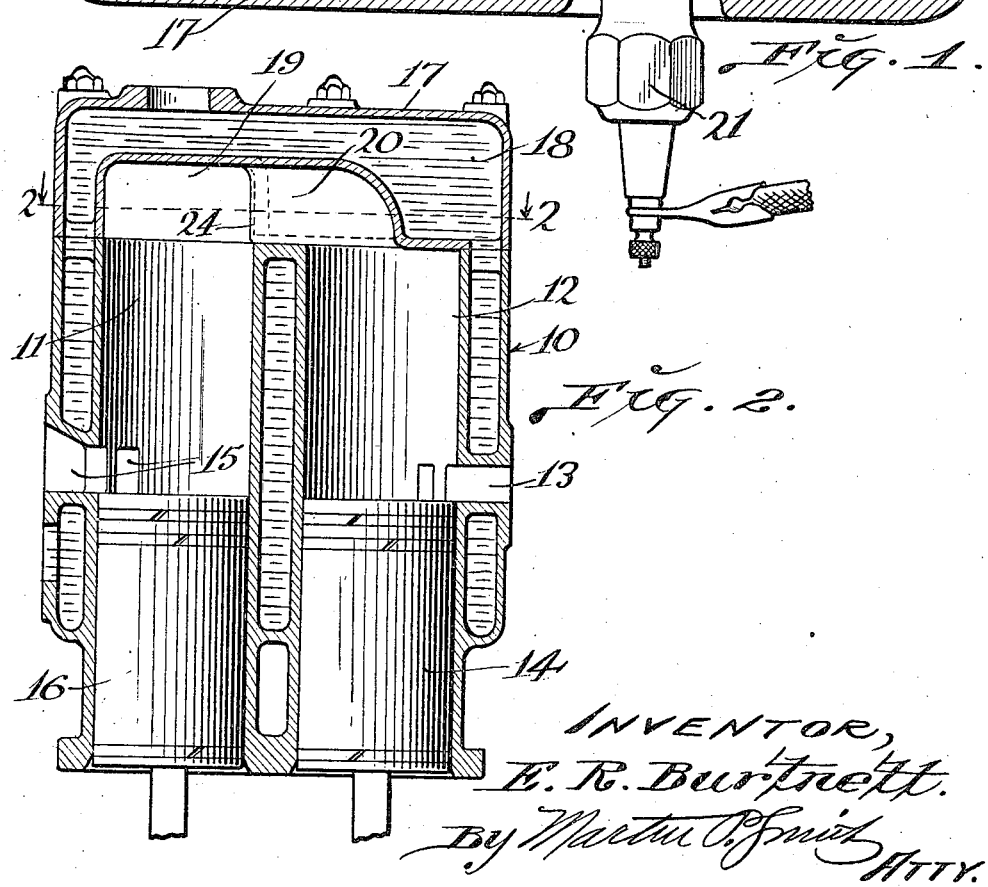

With the foregoing and other objects in view, my invention consists in the features of construction and combination and arrangement of parts hereinafter more fully described and claimed, reference being had to the accompanying drawings, in which Figure 1 is a horizontal section taken on the line 2—2 of Fig. 2, through the center of a pair of combustion cylinders of an engine with the head for said cylinders provided with a turbulence chamber as contemplated by my invention;

Figure 2 is an enlarged vertical section taken through the center of a pair of combustion chambers of Fig. 1.

Referring by numerals to the accompanying drawings, which illustrate a practical embodiment of my invention, 10 designates an engine cylinder block, 11 and 12 a pair of combustion chambers within said block, 13 gaseous fuel inlet ports that lead into the combustion chamber 12 and which are uncovered and open only while the piston 14 that operates within said chamber 12 passes low or outer dead center, and 15 exhaust ports that lead from combustion chamber 11, which exhaust ports are uncovered and open only while piston 16 that operates within said chamber 11 passes low or outer dead center.

Secured in any suitable manner on the head end of block 10 is a head block 17, preferably of the type having a cell or chamber 18 through which may be circulated a fluid cooling medium such as water, and formed in the under side of this head block is a substantially circular recess or chamber that coincides with and constitutes an upward extension of combustion chamber 11 in block 10.

Formed in the under side of the head block 17 is a relatively short duct or passageway 20 that connects the upper end of combustion chamber 12 with the side of turbulence chamber 19. Thus the chamber 19 and duct 20 constitute a common clearance compression and ignition chamber for the combustion chambers 11 and 12, and seated in the side of head 17 adjacent to the end of the duct 20 that communicates with combustion chamber 12 is an ignition device, such as a spark plug 21, the inner ends of the electrodes of which project into the end of duct 20 immediately adjacent to the point where the same communicates with the upper end of combustion chamber 12. That portion of the side wall of duct 20 that unites with the circular side wall of chamber 19 is formed so that its inner face 22 is concave and the curvature of said face is such that it gradually passes from the substantially straight inner side face of the duct to the circular inner face of the wall of chamber 19. The opposite or inner side wall of duct 19 is formed so that its inner face 24 curves gradually inward toward the concave surface 23, and there is an abrupt point or shoulder 25 formed at the juncture of said inwardly curved face 24 and the curved inner face of the side wall surrounding the chamber 19. However, the width or clearance between the side walls of duct 20 is practically the same throughout its length so that there is no constriction that would otherwise retard the free flow of gaseous fuel through said duct and from combustion chamber 12 to combustion chamber 11. The curved face 24 and the point or shoulder 25 tend to deflect the gaseous fuel passing through the duct toward the concaved face 23 that gradually merges with the circular side wall of chamber 19, and as a result the gaseous fuel passing through the duct is directed toward the curved surface 23 just prior to the point where said gaseous fuel enters the turbulence chamber, and as a result of this action the gaseous fuel is caused to enter said turbulence chamber in a substantially curved path that tends to accelerate its whirling movement within said turbulence chamber and while passing around the circular side wall thereof.

This free unrestricted flow of gaseous fuel through the duct 20 and the deflection of said gaseous fuel toward the curved surface 23 just at the time when said gases enter the turbulence chamber are effective in accelerating and enhancing the turbulent whirling movement of the gaseous fuel within the turbulence chamber, and as a result a very thorough and intimate mixture of the residual products of combustion and the inducted charge of fresh gaseous fuel is effected and efficiency of engine operation is materially increased.

It will be understood that while pistons 14 and 16 are passing their low or outer centers inlet ports 13 and exhaust ports 15 are uncovered. Gaseous fuel entering inlet ports 13 passes upwardly through combustion chamber 12 and thence through duct 20 and turbulence chamber 19, and thence downward through combustion chamber 11, thereby driving the greater portion of the products of combustion resulting from the previously ignited charge out through exhaust ports 15. As the pistons 14 and 16 start on their upward or inward stroke ports 13 and 15 will be closed and as said pistons continue to move inwardly the inducted gaseous fuel charge and the residual products of combustion will be compressed in turbulence chamber 19 and duct 20, but as the greater proportion of the charge is formed by the relatively large proportion of fresh gaseous fuel within the combustion chamber 12, the latter will be forced as compression increases through duct 20 to set up turbulence and agitation within chamber 19, thereby effecting a very thorough mixture of the fresh gaseous fuel with the residual products of combustion.

At the point of highest compression or immediately thereafter a spark is produced between the terminals of the electrodes of the plug 21 and this spark occurring during turbulence will result in rapid flame propagation through the compressed fuel mixture and the rapid rise in pressure following ignition of the charge will be directed against the heads of the pistons 14 and 16 to drive the same downward or outward on their power stroke.

Obviously the construction of the turbulence head for internal combustion engines as herein illustrated and described may be changed in minor details without departing from the spirit of my invention, the scope of which is set forth in the appended claims.

I claim as my invention:

1. An internal combustion engine having a pair of combustion cylinder chambers arranged side by side with their axes parallel, a head closing said chambers, said head having a turbulence chamber that is substantially coincident with and which constitutes an extension of one of the combustion chambers in the engine, and a duct formed in said head and connecting the side of the chamber therein with the side portion of the other combustion chamber which duct is disposed wholly to one side of the vertical plane occupied by the axes of the two combustion chambers.

2. An internal combustion engine having a pair of combustion cylinder chambers arranged side by side with their axes parallel, a head closing said chambers, said head having a turbulence chamber that is substantially coincident with and which constitutes an extension of one of the combustion chambers in the engine, a duct formed in said head and connecting the side of the chamber therein with the side portion of the other combustion chamber which duct is disposed wholly to one side of the vertical plane occupied by the axes of the two combustion chambers, and ignition means seated in said head and projecting into said duct.

3. An internal combustion engine having a pair of combustion cylinder chambers, a head closing said chambers, said head having a turbulence chamber that is substantially coincident with and which constitutes an extension of one of the combustion chambers in the engine, a duct formed in said head and connecting the side of the chamber therein with the side portion of the other combustion chamber which duct is disposed wholly to one side of the vertical plane occupied by the axes of the two combustion chambers, and the side walls of the duct adjacent to the point where the same communicates with the chamber in the head being formed with concave surfaces.

4. The combination, with an internal combustion engine having a pair of combustion cylinder chambers arranged side by side with their axes parallel, of a head closing said combustion chambers, said head having a turbulence chamber that coincides with and forms a continuation of one of the combustion chambers, a tangentially disposed duct connecting said turbulence chamber with the side of the other combustion chamber and which turbulence chamber and duct function as a common clearance compression and ignition chamber for the two combustion chambers.

5. The combination, with an internal combustion engine having a pair of combustion cylinder chambers arranged side by side with their axes parallel, of a head closing said combustion chambers, said head having a turbulence chamber that coincides with and forms a continuation of one of the combustion chambers, a tangentially disposed duct connecting said turbulence chamber with the side of the other combustion chamber and which turbulence chamber and duct function as a common clearance, compression and ignition chamber for the two combustion chambers, and an ignition device seated in the head and projecting into said duct.

6. The combination, with an internal combustion engine having a pair of combustion cylinder chambers, of a head for said chambers, which head is provided with a turbulence chamber that is coincident with and forms an extension of one of said combustion chambers, said head being provided with a duct that connects the other combustion chamber with said turbulence chamber, said duct being tangentially disposed with respect to said turbulence chamber, and the inner faces of the side walls of said duct adjacent to the point where the same joins the turbulence chamber being formed so as to cause the gaseous fuel passing through said duct to traverse a curved path as it enters said turbulence chamber.

7. The combination with an internal combustion engine having a pair of combustion cylinder chambers arranged side by side with their axes parallel, one of which is provided with an exhaust port, of a cylinder head closing the head ends of said combustion chambers, a turbulence chamber formed in said head directly over the combustion chamber having the exhaust port, and a duct leading from said turbulence chamber to the other combustion chamber, which duct is located wholly to one side of the vertical plane occupied by the axes of the two combustion chambers.

8. The combination, with an internal combustion engine having a pair of combustion cylinder chambers arranged side by side with their axes parallel, one of which is provided with an exhaust port, of a cylinder head closing the head ends of said combustion chambers, a turbulence chamber formed in said head directly over the combustion chamber having the exhaust port, a duct leading from said turbulence chamber to the other combustion chamber, and which duct is tangentially arranged relative to the wall surrounding said turbulence head and located wholly to one side of the vertical plane occupied by the axes of the two combustion chambers.

In testimony whereof I affix my signature.

EVERETT R. BURTNETT.